Jan. 5, 1971     C. PAVONE ET AL     3,552,197

FORCE RESOLVER FOR INFLIGHT THRUST DETERMINATION

Filed Nov. 25, 1968

INVENTORS
CARLO PAVONE
HANS KARL ZIEBARTH
BY Harry A. Herbert Jr.
and Orsen Tashjian
ATTORNEYS United States Patent Office 3,552,197
Patented Jan. 5, 1971

3,552,197
FORCE RESOLVER FOR INFLIGHT THRUST DETERMINATION
Carlo Pavone, Los Angeles, and Hans Karl Ziebarth, Pacific Palisades, Calif., assignors to the United States of America as represented by the Secretary of the Air Force
Filed Nov. 25, 1968, Ser. No. 778,473
Int. Cl. G01l 5/16
U.S. Cl. 73—117.4                              3 Claims

ABSTRACT OF THE DISCLOSURE

A direct thrust determination system for determining the total force applied by one or more engines in a VTOL aircraft by resolving for each engine mount the thrust force into force components along three orthogonal directions and separately adding the force components along each orthogonal direction and, in addition, for determining the total moment about each of three arbitrary axes of the aircraft which moments are applied by the engines, by summing the products of each parallel force component by its distance from each one of the arbitrary axes.

BACKGROUND OF THE INVENTION

This invention relates to the direct measurement of engine thrust forces and, more particularly, the invention is concerned with providing a technique for measuring the thrust of reaction-type propulsors in a direct manner by measuring the strains induced in the components that support the propulsor.

Heretofore, the direct measurement of turbojet engine thrust, while established practice for test bed installations of conventional engines and also recently of vectoring engines, has been attempted only in isolated instances for flight installations.

Past efforts in the area of direct thrust measurement have often been discontinued because the overall obtainable accuracies do not meet the exacting requirements of flight test operations. However, in military VTOL (vertical take-off and landing) operations direct data on available propulsive lift and moments are of vital importance for pilot decisions, particularly prior to landing transition.

SUMMARY OF THE INVENTION

The present invention is concerned with measuring the total forces and total moments occurring as a result of the propulsion-lift system of a VTOL aircraft. The forces are produced, primarily, as a result of the engine thrust forces reacting at the engine mount points. Use of a modified engine mount trunnion according to the present invention which incorporates in each trunnion two force-sensing flexures having coincident centers disposed at 90 degrees, offers a highly directional force resolving capability.

Accordingly, it is an object of the present invention to provide a device for determining thrust force components of a VTOL aircraft or the like by measuring the strains induced in certain elements in the engine mount system.

Another object of the invention is to provide a thrust measurement device which is compatible with typical VTOL power plant installations such that the structural integrity of the VTOL propulsion system is not compromised by the installation and operation of the device.

Still another object of the invention is to provide a thrust measuring device for use on VTOL aircraft, including military aircraft, which is extremely reliable and meets the operational requirements of high integrity. A minimum number of reliable components are used making the output of the device usable for flight control purposes.

A further object of the invention is to provide a thrust measuring device which is extremely accurate for use on VTOL aircraft having a low thrust-to-weight ratio.

A still further object of the invention is to provide a thrust measuring system that is not restricted to measure forces and moments on engines whose thrust is directed downward. The system works equally well on aircrafts having engines producing horizontal thrust or thrust at any other angle as produced by swinging nozzle engines.

Another further object of the invention is to provide a thrust measuring device including maintainability features which provide for rapid confidence testing and malfunction isolation. The components of the device are easily replaceable in a manner compatible with conditions typical of military operations at advance base level.

Another still further object of the invention is to provide a thrust measuring device which can be installed on a VTOL aircraft without compromising safety-of-flight or representing a risk with regard to any other aircraft or propulsion system function.

A feature of this system is that the transducers or trunnions for the various engines are identically oriented so that the respective parallel force components from each one of the transducers need only be added together and displayed. In addition, the moment with respect to any arbitrary axes can be obtained by the summation of the products of each parallel force component by its distance from the arbitrary axis in question and the resultant moment can also be displayed. The three arbitrary axes could be chosen to be the principal axes of the aircraft, i.e., roll, pitch and yaw axes.

These and other objects, features and advantages will become more apparent after considering the description that follows taken in conjunction with the attached drawings and appended claims.

PREFERRED EMBODIMENT OF THE INVENTION

Although the utilization of the present invention is directed toward its use to determine the inflight thrust forces on a VTOL aircraft as reacted at the engine mount points, it should be understood that effective use of the invention can be made in non-aerospace applications. For example, the system according to the invention would allow in-motion weighing of materials transported by conveyor belts and could also be used for determining true value of aerodynamic effects in wind tunnel tests.

The herein described system measures the total forces and moments exerted by any number of thrustors mounted in any direction and with variable or vectoring thrust direction on a flight vehicle, in the form of the components of the resultant forces in three mutually perpendicular axes and their moments with respect to other axes.

Figure 1:
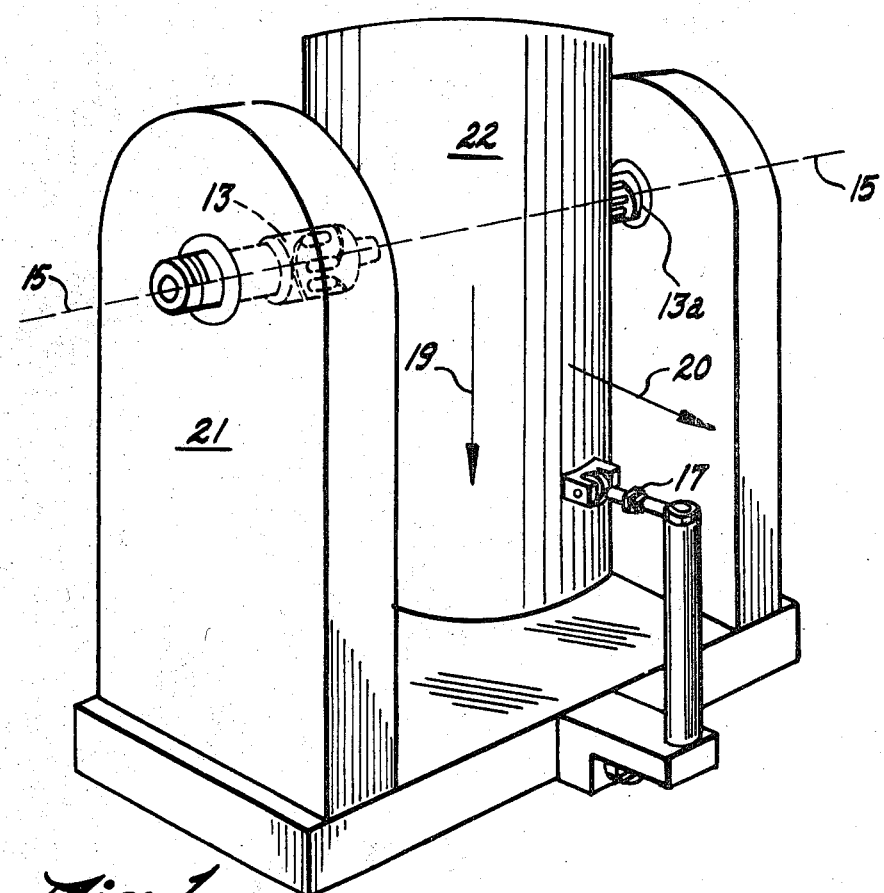
FIG. 1 is an illustrative view of the thrust measuring system model which is representative of an actual VTOL engine mount ssytem.

The system uses a conventional three-point mounting arrangement for the individual propulsor. As shown in FIG. 1, two trunnions 13 and 13a of the type shown in FIG. 2, with common axis 15 are provided in a common plane of the propulsor and one restraining link 17, offset at a known angle to the axis of the two rear trunnions 13 and 13a, in another plane.

At mount points along the axis 15, the two trunnions 13 and 13a which function as force resolving transducers, are installed with their coincident center flexures oriented in the directions indicated by the arrows 19 and 20. One end of each of the trunnions or transducers 13 and 13a is fixed to frame 21 which represents the aircraft frame. The other end of each of the trunnions 13 and 13a are pin connected by ball joints to the propulsor 22 to allow rotation of the propulsor in a plane perpendicular to the axis 15 if not restrained by the link 17.

The system can be used with propulsors installed at an arbitrary axis attitude angle. Each of the two resolving transducers 13 and 13a installed at mount points along the axis 15 resolves the propulsor thrust (which may be vectoring) in two orthogonal directions, furnishing also the magnitudes of the thrust components in these directions. For measurement of the thrust component in a direction perpendicular to these directions, or in the direction of the trunnion axis 15, a flat load cell (not shown) is used. The restraining link 17 is sensitive only to tension or compression forces being connected to the propulsor and the vehicle structure by swivel joints.

With this mount arrangement the system is statically determined and all forces between engine and airframe are measured. The trunnion mount force resolver 13 will be subject to three force reactions having vertical, drag and side components. The trunnion mount 13a will be subject to two force reactions having vertical and drag components and restraining link 17 is subject to one force reaction. No measuring element for forces in the "side" direction is used at one of the two trunnions 13 and 13a in order to allow for radial thermal expansion of the engine. Thus, the side force is measured only at mount 13 and the support at mount 13a has a low spring constant in the direction 15 and acts only as a centering device. The light reaction of the support 13a on the side force measuring cell (not shown) can be calculated out of the measurement of the side force knowing the coefficient of radial expansion of the engine, the temperature of the engine, and the spring constant of the mount 13a in the direction 15. By taking six measurements per engine, as described, it is possible to determine all the forces acting in the principal axes of the aircraft. Using as reference axes the three mutually perpendicular roll, pitch and yaw axes, the resultant, its orthogonal components as well as their moments (or distances) from these axes can be determined.

Figure 2:
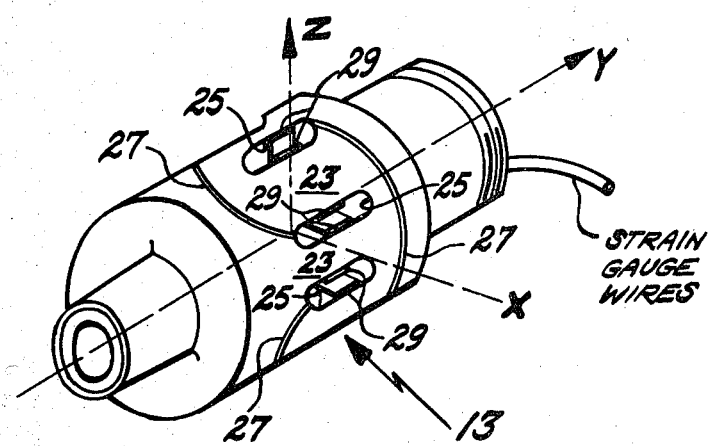
FIG. 2 is a schematic view of the force transducer according to the invention which operates as a flexure-trunnion mounting between the engine and aircraft frame.

Referring in more detail to FIG. 2, for the measurement of the forces reacted at the engine mount points, an arrangement of four beam flexures 23, two of which are in a vertical plane and two in a horizontal plane through the engine trunnion axis. The four flexures are formed by four rectangular bores 25 through a trunnion of annular cross section and four straight relieving slots 27 in planes at an angle of 45 degrees to a plane through the trunnion axis.

Strain gages 29 are applied to the four flexure beams 23 of the force transducer as force-sensing elements. For this application, nickel-chromium grid strain gages of a type completely encapsulated in a laminated matrix of high temperature resin glass-fiber reinforced were attached using epoxy cement as the bonding medium. Other measuring means, such as capacitive or inductive devices, may be used to measure displacement of the flexure portions.

Although the invention has been illustrated in the accompanying drawing and described in the foregoing specification in terms of a preferred embodiment thereof, the invention is not limited to this embodiment or to the particular configurations mentioned. It will be apparent to those skilled in the art that our invention can be used. Also, it should be understood that various changes, alterations, modifications, and substitutions, particularly with respect to the construction details, can be made in the arrangement of the several elements without departing from the true spirit and scope of the appended claims.

Having thus described our invention, what we claim and desire to secure by Letters Patent of the United States is:

1. A force resolver for inflight thrust determination of an aircraft having a propulsor, said force resolver comprising a plurality of components for supporting the propulsor on said aircraft at a plurality of mount points, said components including trunnions positioned at the propulsor mount points, said trunnions being annular in cross section, a plurality of beam flexures disposed in said components, one-half of said plurality of beam flexures being oriented in a horizontal plane and the other half of said plurality of beam flexures being oriented in a vertical plane, said flexures in each of said components being disposed substantially in a plane normal to both said horizontal and vertical planes, and sensing means attached to said beam flexures for indicating the magnitude and direction of the forces produced by the propulsor of said aircraft.

2. The force resolver defined in claim 1 wherein each of said plurality of beam flexures is formed by a pair of spaced rectangular bores through the wall of said trunnion, the undisturbed material between said rectangular bores forming a beam, said sensing means being attached to the walls of said beam in said bores.

3. The force resolver defined in claim 2 wherein a relieving slot is in communication with one end portion of each of said rectangular bores, said relieving slots being oriented at an angle of 45 degrees to a plane through the trunnion axis allowing each of said beams to flex freely in reaction to the propulsive forces.

References Cited
UNITED STATES PATENTS

| 2,385,005 | 9/1945 | Langer | 73—88.5X |
| 3,217,536 | 11/1965 | Motsinger et al. | 73—141AX |
| 3,272,003 | 9/1966 | Harting | 73—88.5X |

JERRY W. MYRACLE, Primary Examiner

U.S. Cl. X.R.

73—133, 141